Sept. 21, 1948. S. R. LEESON 2,449,662
JOURNAL BEARING SLEEVE
Filed Feb. 12, 1945
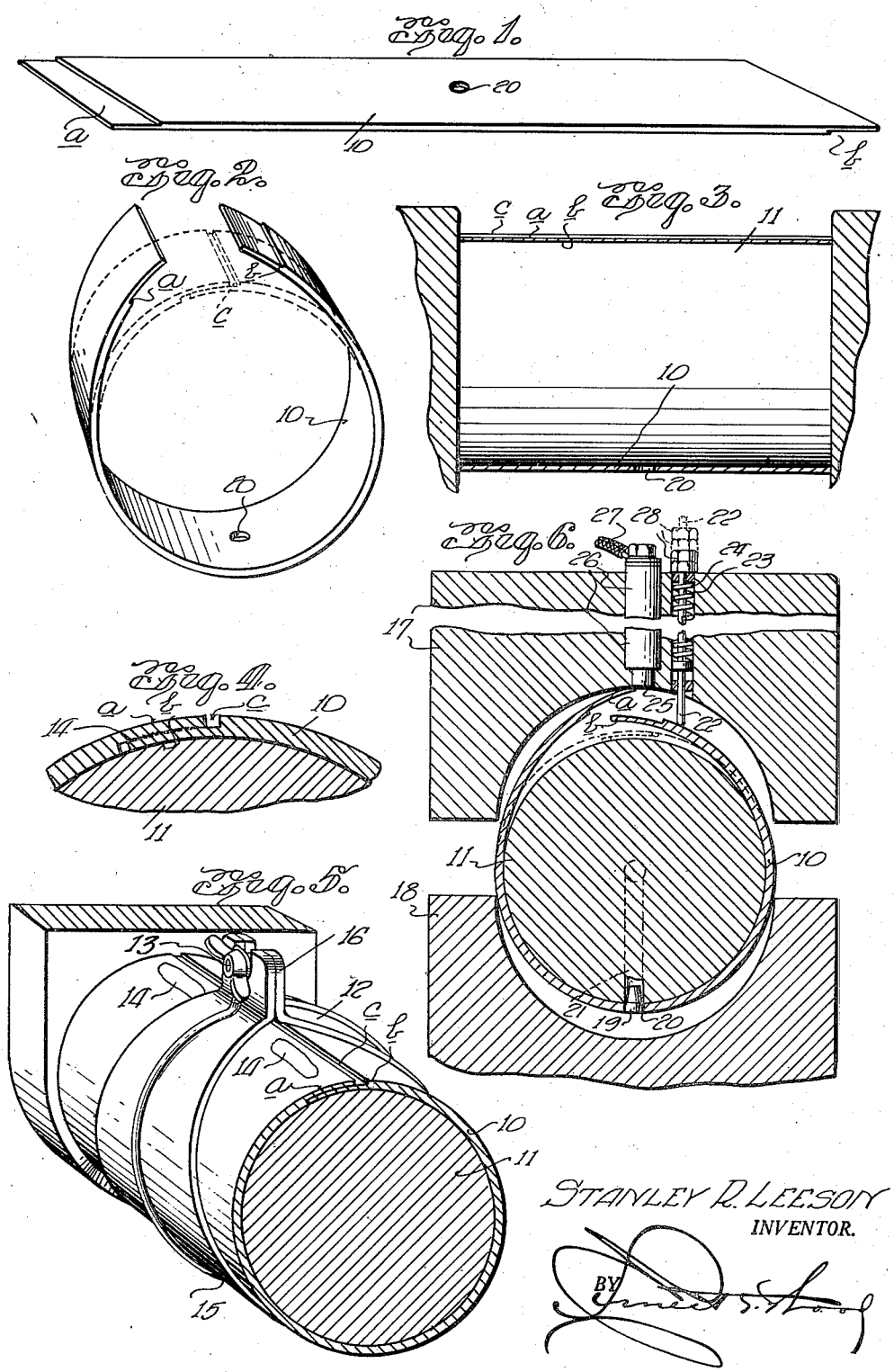
STANLEY R. LEESON
INVENTOR.

Patented Sept. 21, 1948

2,449,662

UNITED STATES PATENT OFFICE 2,449,662

JOURNAL BEARING SLEEVE

Stanley R. Leeson, Dallas, Tex.

Application February 12, 1945, Serial No. 577,542

5 Claims. (Cl. 308—237)

This invention relates to the hardening and building up of journals as exemplified by crankshafts or other mandrels or journals which rotate on or in a bearing.

The principal object of the invention is to lessen the cost of repairs to such elements as internal combustion or steam engine crankshafts or any other rotating shafts, when the journals become worn, distorted or out of round for any reason.

Another object of the invention is to restore the original dimension of a journal by first grinding the shaft to a predetermined size and then encasing the journals in sleeves which are held in position by the novel steps of welding and shrinking into place. This procedure is anticipated also as an economical measure in hardening large but small in volume production crankshafts, viz; the welding and shrinking on of a sleeve of prehardened metal.

With the foregoing objects as paramount, the invention has further reference to certain features of accomplishment which will become apparent as the description proceeds, taken in connection with the accompanying drawings wherein:

Figure 1 is a perspective view of a flat strip of metal blanked to predetermined dimensions and whose ends are reduced in thickness or step-cut to approximately one-half the gauge of the body proper.

Figure 2 is a perspective view of a sleeve in near cylindrical form preparatory to application to a journal and shows in dotted lines the operative position thereof.

Figure 3 is a side elevational view of a crank pin, showing the sleeve in vertical section.

Figure 4 is a fragmentary view of a sleeve on a journal showing the step-cut joint.

Figure 5 is a perspective view, fragmentarily showing a crank arm and pin on which a sleeve is temporarily clamped for welding and shrinking, and Figure 6 is a view in vertical section, showing forming dies in the act of constricting a sleeve on a journal as a modified form of application.

The conventional method of renewing the wearing surface of a journal is in first grinding away a portion of the journal until it becomes round then installing undersize bearings on the journal.

The sleeve of the invention is not a bushing or bearing made from non-ferrous metals or otherwise but instead, is a surface applied to an existing journal, the object being two-fold, first: to present a hard surface to the bearing in which it rotates, and second: to accomplish an inexpensive repair of existing shafts by sleeving the surface, as stated.

The limits to producing high load carrying capacity bearings, that is to say, bearings from material capable of high loads, such as silver, cadmium, copper, lead, etc., are all determined by the characteristics of the crankshaft. Soft shafts limit the load carrying capacity of bearings to material such as tin, lead, etc., but permit high tensile strength, thus forcing the use of larger surface areas to carry loads. Hard shafts, which are very expensive as well as more hazardous, permit the use of high load carrying bearing materials (cadmium, silver, copper, lead, etc.) thus reducing size and weight of crankshafts but the expense, especially on large size, small volume production shafts, make them prohibitive.

The power output of engines is dependent on crankshaft and bearing load capacity, both of which are predicated on the surface hardness of the shaft, since this hardness controls the bearing material that can be used.

It is possible to make crankshafts from very tough steel of high tensile strength, thus adding considerably to the torque characteristics and insuring high load carrying capacity with lessened hazards from breaking. At the same time, the journals would have a hard surface on which can be used bearings made of material that will permit accelerated loads being exerted by the engine without scoring or otherwise impairing the journals.

The present invention broadly embraces a hardened sleeve appliqued to a journal ground to predetermined dimension to restore original diameter, but the methods of applying the sleeve may vary widely.

Accordingly and with detailed reference to the drawing, numeral 10 denotes a strip of metal of predetermined hardness, blanked to predetermined dimensions and reduced at its ends in wall thickness to approximately one-half the gauge of the body. This reduction in wall thickness is reversed as shown at $a$ and $b$, thus affording a step-cut joint when the strip 10 is rolled into a sleeve, as shown in the other figures and which carries the same reference numeral 10. Thus, the combined thicknesses of the step-cut ends $a$ and $b$ will be the equivalent of the gauge of the main body of the sleeve throughout.

Removal of the material to form the step-cut ends $a$ and $b$ is accomplished by one of the many methods, viz: surface grinding, surface milling, surface planing or press extrusion.

Primarily, the sleeve blank may be formed into half or near cylindrical form by means of press dies, by curling rolls or other means familiar to the industry to secure the shape illustrated in Figure 2 which facilitates the operation of finally applying the sleeve to a journal.

In Figure 5 is shown a simple method of installing the sleeve 10 on a crank pin 11. This method consists in first heating the sleeve to a predetermined temperature and in applying the same with tongs or other means and then in drawing the step cut ends together in their proper overlapping relationship by means of a conventional clamp 12. After tightening the clamp by a screw 13, the overlapping ends a and b are spot welded or otherwise bonded together at 14. The clamp is then removed and as the sleeve 10 cools, it shrinks upon the pin or journal 11.

It will be observed that while the general construction and adaptation of the clamp 12 is of conventional construction, it consists of a reinforced metal strip whose midsection 15 is of a width substantially equal to the length of the sleeve 10, tapering to form narrower ends, turned at their extremities into parallel, bifurcated ears 16 to receive the bolt 13. By so forming the clamp, the ends a and b of the strip 10 are held in centered relationship as the clamp is closed to compress the same into sleeve form as shown.

Another and more expedient method of applying the sleeve 10 for faster and larger production is illustrated in Figure 6 wherein cooperating die elements 17 and 18 are employed in a power press (not shown). The partly formed sleeve 10 is snapped onto the pin or journal 11 at the proper temperature and secured against rotative displacement thereon as by inserting a plug 19 through an oil hole 20 in the sleeve into the oil passage 21 of the pin 11. As the two die elements are advanced upon the pin 11, the step cut ends a and b of the sleeve 10 are disposed in their proper overlapping relationship by means of a retractable pin 22, extending through an opening 23 in the upper die element and embraced by a spring 24 resisting upward movement thereof. As the die element 17 moves downwardly the pin 22 will first engage the sleeve 10 adjacent the end b, depressing this end below the end a, so that the latter, as the die element continues downward, will assume a superimposed position on the end b, as shown in dotted lines in Figure 6, which is the position of the ends a and b when the die elements 17 and 18 fully embrace the sleeve on the journal.

Subsequent to or simultaneous with the clamping action of the die elements 17 and 18, the ends a and b of the sleeve are spot or line welded by means of one or more welding electrodes 25 in centered relationship with the overlapping ends a and b of the sleeve. The electrode or electrodes 25 are embraced by a ceramic shell 26 which, in turn, is located in an opening in the upper die section 17. Wires 27 lead to the electrode 25, as shown in Figure 6.

Predetermined tension on the pin 22 may be effected and adjusted by nuts 28, threaded upon the upper end of the pin. Obviously, other means for the same purpose may be employed in substitution of the pin 22 so long as such means is effective to properly dispose the sleeve ends a and b in relation to each other.

After welding the sleeve in the manner explained, the die elements 17 and 18 are retracted and the sleeve, in cooling, will contract upon the pin or journal 11. Ordinarily, machining of the sleeve 10 after its application as described, is not necessary. It will be observed that the step cut portions a and b are of such width that when the sleeve 10 is affixed as described, on a journal, as space c is defined the length of the sleeve intermediate the shoulder adjacent one end of the strip 10 and the opposite end thereof, affording the equivalent of an oil retaining groove or sump. Manifestly, the construction as shown and described is capable of some modification and such modification as may be construed to fall within the scope and meaning of the appended claims is also considered to be within the spirit and intent of the invention.

What is claimed is:

1. As a new article of manufacture, a journal bearing comprising a hardened metal strip of predetermined dimensions, formed into a sleeve about a journal and having step cut ends secured in overlapped relationship, whose combined thickness is equal to that of said strip, the shoulder adjacent one end being spaced from the opposite end of said strip to define an oil sump longitudinally of said sleeve.

2. A surface restoring sleeve for journals comprising a metallic strip of cylindrical form having its ends oppositely step cut to one-half the thickness of the strip to define shoulders and welded in overlapping relationship to hold said sleeve constrictedly on said journal whereby said shoulders will be in spaced relation to the ends of said strip to form oil grooves.

3. The method of restoring an impaired bearing surface which consists in grinding said surface, in forming a strip from hardened metal, in reducing the end thickness of the strip to half that of the strip proper to define interior and exterior shoulders, in heating the strip, in wrapping the strip about an impaired bearing surface to overlap its ends but in spacing said shoulders from said ends to form longitudinal grooves and in bonding the overlapped ends of the strip.

4. The hereindescribed method of restoring an impaired bearing surface characterized by initially smoothing said surface by grinding, in forming a strip from a sheet of metal, in reducing the thickness of the ends of the strip to define underlying and overlying shoulders, in heating and applying said strip about said surface to overlap its ends and finally in welding said overlapped ends in spaced relationship to said shoulders to form longitudinal oil grooves.

5. In combination with a journal mandrel, a sleeve comprised of a strip of hardened metal, one end of which is reduced in thickness on one side and the other reduced in thickness on the opposite side to define shoulders whereby the combined thickness of the ends in overlapped relationship to form said sleeve will be equal to the thickness of the sleeve intermediate said ends but in which the said shoulders will be spaced from the extremities of said strip to form oil retaining grooves, and means for permanently joining said ends to constrict said sleeve on said journal mandrel.

STANLEY R. LEESON.

REFERENCES CITED

The following references are of record in the file of this patent:

UNITED STATES PATENTS

| Number | Name | Date |
|---|---|---|
| 1,374,624 | Zumwalt | Apr. 12, 1921 |
| 1,646,371 | Shoemaker | Oct. 18, 1927 |
| 1,947,462 | Doorbar | Feb. 20, 1934 |
| 1,971,433 | Tartrais | Aug. 28, 1934 |
| 2,242,996 | Andrews | May 20, 1941 |